United States Patent
Komura et al.

(10) Patent No.: US 10,854,872 B2
(45) Date of Patent: Dec. 1, 2020

(54) METHOD FOR MANUFACTURING ELECTRODE FOR LITHIUM ION SECONDARY CELL

(71) Applicant: ZEON CORPORATION, Tokyo (JP)

(72) Inventors: Shingo Komura, Okazaki (JP); Yuya Kitagawa, Yokohama (JP); Yuji Shibata, Kawasaki (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/528,546

(22) PCT Filed: Nov. 10, 2015

(86) PCT No.: PCT/JP2015/081648
§ 371 (c)(1),
(2) Date: May 22, 2017

(87) PCT Pub. No.: WO2016/084600
PCT Pub. Date: Jun. 2, 2016

(65) Prior Publication Data
US 2017/0279114 A1    Sep. 28, 2017

(30) Foreign Application Priority Data
Nov. 26, 2014    (JP) .................................. 2014-238766

(51) Int. Cl.
*H01M 4/04*    (2006.01)
*H01M 4/139*    (2010.01)
(Continued)

(52) U.S. Cl.
CPC ............. *H01M 4/139* (2013.01); *H01M 4/36* (2013.01); *H01M 4/66* (2013.01); *H01M 10/052* (2013.01); *H01M 10/0525* (2013.01)

(58) Field of Classification Search
USPC ............................................... 427/115, 98.4
See application file for complete search history.

(56) References Cited

U.S. PATENT DOCUMENTS

| 10,084,179 B2 * | 9/2018 | Tanihara | H01M 4/139 |
| 2005/0285080 A1 * | 12/2005 | Suzuki | H01G 9/042 252/182.1 |

(Continued)

FOREIGN PATENT DOCUMENTS

| CN | 102856579 A | 1/2013 |
| CN | 103825050 A | 5/2014 |

(Continued)

OTHER PUBLICATIONS

Dec. 8, 2015, International Search Report issued in the International Patent Application No. PCT/JP2015/081648.

(Continued)

*Primary Examiner* — Brian K Talbot
(74) *Attorney, Agent, or Firm* — Kenja IP Law PC

(57) ABSTRACT

The method for manufacturing an electrode for a lithium ion secondary cell proposed herein includes: a step of pattern-coating a binder liquid 21*d* on a current collector 12 and forming a binder coat layer 16, and a step of supplying granulated particles 32 onto the binder coat layer 16. The binder coat layer 16 is intermittently formed on the current collector 12 so that band coated portions 16*a* and band uncoated portions 16*b* are alternatingly adjacent to each other. The width t1 of the coated portions 16*a*, the width t2 of the uncoated portions 16*b*, and the average particle diameter R of the granulated particles 32 satisfy the following relationships: $0.53R \leq t1 \leq 10R$; $0.66R \leq t2 \leq 10R$; and $0.2 \leq t1/t2 \leq 3.75$.

5 Claims, 10 Drawing Sheets

(51) Int. Cl.
*H01M 4/66* (2006.01)
*H01M 10/052* (2010.01)
*H01M 4/36* (2006.01)
*H01M 10/0525* (2010.01)

(56) References Cited

U.S. PATENT DOCUMENTS

| | | | | |
|---|---|---|---|---|
| 2012/0295159 | A1* | 11/2012 | Kobayashi | H01M 4/133 |
| | | | | 429/211 |
| 2013/0004843 | A1 | 1/2013 | Suzuki et al. | |
| 2014/0079872 | A1* | 3/2014 | Uchida | H01M 4/621 |
| | | | | 427/58 |
| 2014/0342223 | A1* | 11/2014 | Voelker | H01M 4/622 |
| | | | | 429/217 |
| 2015/0050535 | A1* | 2/2015 | Amiruddin | H01M 4/133 |
| | | | | 429/94 |
| 2016/0181651 | A1* | 6/2016 | Tanihara | H01M 4/0409 |
| | | | | 118/712 |
| 2017/0279114 | A1* | 9/2017 | Komura | H01M 4/139 |
| 2017/0352874 | A1* | 12/2017 | Hosono | H01M 10/0525 |

FOREIGN PATENT DOCUMENTS

| | | | |
|---|---|---|---|
| JP | 09306471 | * | 11/1997 |
| JP | 2013-012327 | * | 1/2013 |
| JP | 2013-012393 | * | 1/2013 |
| JP | 2013012393 | A | 1/2013 |
| JP | 2014078497 | A | 5/2014 |

OTHER PUBLICATIONS

May 17, 2018, the Extended European Search Report issued by the European Patent Office in the corresponding European Patent Application No. 15862998.0.

* cited by examiner

METHOD FOR MANUFACTURING ELECTRODE FOR LITHIUM ION SECONDARY CELL

TECHNICAL FIELD

The present invention relates to a method for manufacturing an electrode for a lithium ion secondary cell.

The present international application claims priority based on Japanese Patent Application No. 2014-238766 filed on Nov. 26, 2014, the entire contents of which are hereby incorporated by reference.

BACKGROUND ART

An electrode used in a lithium ion secondary cell is typically provided with an active material layer including an active material on a current collector. The active material layer is generally manufactured by coating a slurry composition in which the active material is dispersed in a liquid medium, on the surface of the current collector, drying, and pressing. A method for producing an electrode by powder molding without using a liquid medium is also known. For example, Patent Literature 1 discloses a method for manufacturing an electrode by pattern-coating a binding material (binder) coating liquid on a current collector to form a binder-coated portion and a binder-uncoated portion, then depositing a powder of granulated particles obtained by granulating active material particles and the binder thereon, and pressing.

CITATION LIST

Patent Literature

Patent Literature 1: Japanese Patent Application Publication No. 2014-078497

SUMMARY OF INVENTION

Technical Problem

In such methods for manufacturing an electrode, when a powder of granulated particles is molded, the powder may be leveled with a roll or blade squeegee in order to obtain a uniform basis weight. In the leveling process, the powder of granulated particles supplied onto the current collector is typically guided toward the gap between the current collector and the squeegee and flattened by the squeegee. In the process of leveling with the squeegee, the deposited powder slides on the current collector. As a result, the powder does not adequately enter the gap between the current collector and the squeegee, and a spread can occur in the supply amount (and eventually in the basis weight). In particular, when the molding speed is increased in order to improve productivity, the powder is likely to slip on the current collector and variations are likely to occur in the basis weight.

In this regard, in order to prevent the powder from slipping, it is conceivable to improve the adhesion (binding ability) between the current collector and the granulated particles by increasing the amount of the binding material (binder) coated on the current collector. However, where the amount of binder is simply increased, since the binder acts as an electric resistance component, the cell resistance increases. It would be desirable to improve the adhesion between the current collector and the granulated particles while suppressing the increase in electric resistance. The present invention solves the above-described problem.

Solution to Problem

The method for manufacturing an electrode for a lithium ion secondary cell proposed herein includes: a step of pattern-coating a binder liquid on a current collector and forming a binder coat layer; a step of supplying granulated particles including active material particles and a binder onto the binder coat layer; a step of leveling the granulated particles supplied onto the binder coat layer; and a step of pressing the leveled granulated particles. Here, the binder coat layer is intermittently formed on the current collector so that band coated portions where the binder liquid has been coated and band uncoated portions where the binder liquid has not been coated are alternatingly adjacent to each other. Further, where the width of the coated portion is denoted by t1, the width of the uncoated portion is denoted by t2, and the average particle diameter of the granulated particles is denoted as R, the following relational expressions (1) to (3) are satisfied:

$$0.53R \leq t1 \leq 10R, \quad (1)$$

$$0.66R \leq t2 \leq 10R, \quad (2)$$

$$0.2 \leq t1/t2 \leq 3.75. \quad (3)$$

With such a manufacturing method the powder of the granulated particles can be uniformly leveled while suppressing an increase in electric resistance, and the unevenness in basis weight is easily suppressed to a low level.

In a preferred aspect of the manufacturing method disclosed herein, the width t1 of the coated portion and the average particle diameter R of the granulated particles satisfy $0.53R \leq t1 \leq 2R$. In this way, both a high basis weight accuracy and a low electric resistance can be achieved at a higher level.

In a preferred aspect of the manufacturing method disclosed herein, the width t2 of the uncoated portion and the average particle diameter R of the granulated particles satisfy $0.8R \leq t2 \leq 2.67R$. With such a configuration, both a high basis weight accuracy and a low electric resistance can be achieved at a higher level.

In a preferred aspect of the manufacturing method disclosed herein, the average particle diameter R of the granulated particles is 50 μm to 75 μm. In this case, the width t1 of the coated portion may be 40 μm to 750 μm. The width t2 of the uncoated portion may be 50 μm to 750 μm. When the widths t1 and t2 of the coated portion and the uncoated portion and the average particle diameter R of the granulated particles are within such ranges, the powder of the granulated particles is likely to be appropriately arranged with respect to the binder coat layer.

In a preferred aspect of the manufacturing method disclosed herein, the current collector is a long sheet current collector. In this case, the coated portion may be continuously formed so as to extend in the longitudinal direction of the current collector. In this way, high basis weight accuracy and low electric resistance can be more effectively and reliably achieved.

DESCRIPTION OF EMBODIMENTS

An embodiment of the method for manufacturing an electrode for a lithium ion secondary cell proposed herein will be described hereinbelow. The embodiment described herein is, of course, not intended to place particular limitations on the present invention. In addition, each drawing is schematically drawn. For example, the dimensional relationship (length, width, thickness, etc.) in each drawing does not reflect the actual dimensional relationship. In the present specification, the term "secondary cell" refers to a cell in general that can be repeatedly charged. "Lithium ion secondary cell" refers to a secondary cell that uses lithium ions as electrolyte ions and realizes charging and discharging due to charge transfer by lithium ions between positive and negative electrodes.

Figure 1:
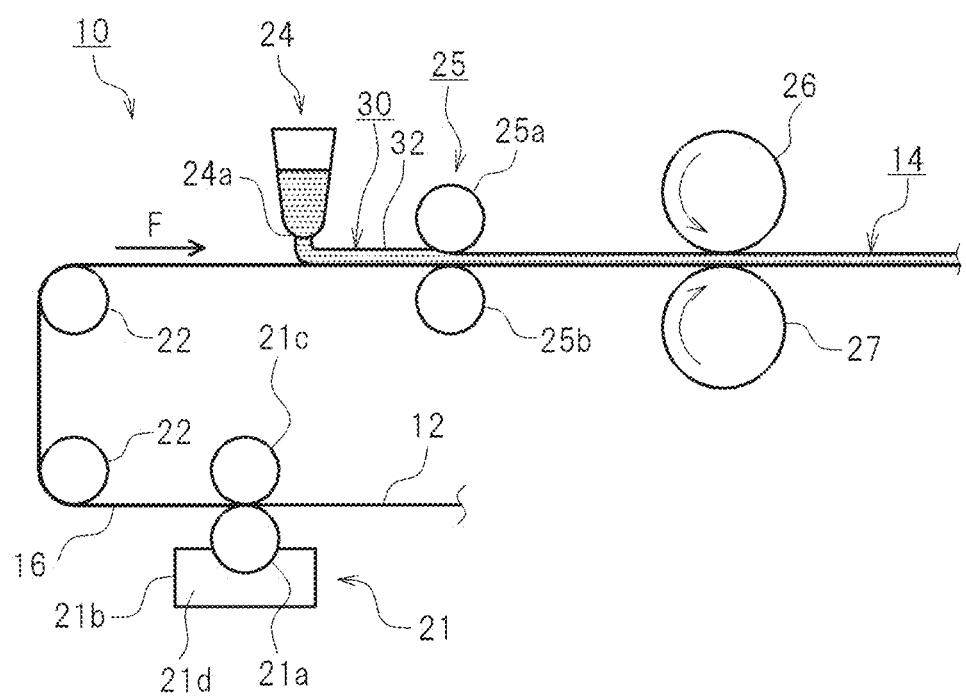
FIG. 1 is a schematic diagram showing a manufacturing apparatus embodying a method for manufacturing an electrode for a lithium ion secondary cell proposed herein.
Figure 2:
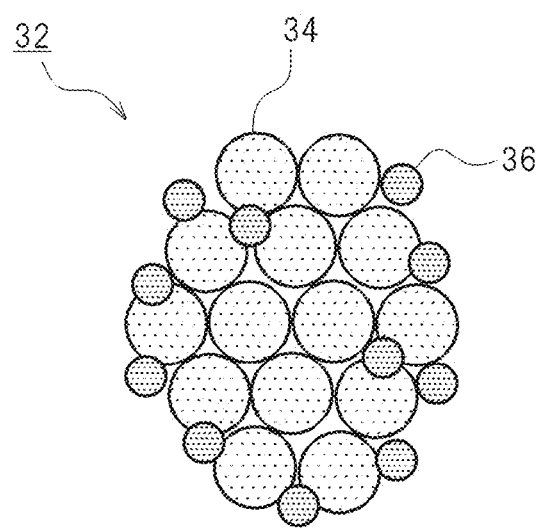
FIG. 2 is a diagram schematically showing a granulated particle.

FIG. 1 is a schematic diagram showing a manufacturing apparatus 10 embodying a process for manufacturing electrodes (positive electrode and negative electrode) according to an embodiment of the present invention. The manufacturing apparatus 10 can be used for both a positive electrode forming step and a negative electrode forming step. Here, as shown in FIG. 1, the manufacturing apparatus 10 includes a conveying device 22, a binder coating device 21, a granulated particle supplying device 24, a squeegee member 25, and press rollers 26, 27. An arrow F in the figure indicates, as appropriate, the conveying direction. Here, the conveying device 22 conveys a current collector 12. The binder coating device 21 applies a binder liquid 21d. The granulated particle supplying device 24 supplies granulated particles 32 (see FIG. 2). These devices constituting the manufacturing apparatus 10 will be described later. FIG. 2 is a diagram schematically showing the granulated particle 32.

The positive electrode forming step and negative electrode forming step proposed herein include the following steps (a) to (d).
(a) step of forming a binder coat layer
(b) step of supplying granulated particles
(c) leveling step
(d) pressing step
<(a) Step of Forming a Binder Coat Layer>

In step (a), a binder coat layer is formed by pattern coating the binder liquid 21d on the current collector 12.

The current collector 12 is a member for extracting electricity from the electrodes (the positive electrode and the negative electrode). For example, a material excellent in electron conductivity and stably present inside the cell is used for the current collector 12 used in a lithium ion secondary cell. Further, a low weight, required mechanical strength, ease of processing, etc. are also needed. For example, in the example shown in FIG. 1, a band metal foil is prepared as the current collector 12. In the example, a band metal foil as a current collector foil may be prepared in a state of being wound around a winding core (such a configuration is not shown in the drawing).

When forming a positive electrode for a lithium ion secondary cell, for example, aluminum or an aluminum alloy is used as the positive electrode current collector. If necessary, the positive electrode current collector may be treated to remove the rolling oil on the surface, thereby improving wettability. For example, the positive electrode current collector may be subjected to heat treatment, corona discharge treatment, or plasma treatment. The thickness of the positive electrode current collector is not particularly limited, but from the viewpoint of high strength and low electric resistance, a thickness of about 5 μm to 30 μm is suitable and a thickness of 10 μm to 20 μm (for example, 15 μm) is preferred.

When forming a negative electrode for a lithium ion secondary cell, for example, copper or a copper alloy is used as the negative electrode current collector. If necessary, the surface of the negative electrode current collector may be subjected to inorganic anticorrosive treatment, organic anticorrosive treatment, or other anticorrosive treatment. The thickness of the negative electrode current collector is not particularly limited, but from the viewpoint of high strength and low electric resistance, a thickness of about 6 μm to 20 μm is suitable and a thickness of 8 μm to 15 μm (for example, 10 μm) is preferred.

The manufacturing apparatus 10 shown in FIG. 1 also implements a step of conveying the above-described band current collector 12 along the length direction. In this step, the current collector 12 as a band current collector is conveyed along a predetermined conveying path by the conveying device 22. As shown in FIG. 1, the band current collector 12 is suitable for carrying out predetermined processing while conveying the current collector by a roll-to-roll system. The current collector is not limited to the metal foil. For example, depending on the application of the electrode to be manufactured, the current collector 12 may be a resin film having electric conductivity.

The binder liquid 21d is obtained by dispersing or dissolving a binder in a solvent. From the viewpoint of reducing the load on environment, a so-called aqueous solvent can be advantageously used as the solvent for the binder liquid 21d. In this case, water or a mixed solvent mainly containing water is used. As a solvent component, other than water, constituting such a mixed solvent, one or two or more kinds of organic solvents (lower alcohols, lower ketones, etc.) which can be uniformly mixed with water can be appropriately selected and used. For example, it is preferable to use an aqueous solvent in which water takes 80% by mass or more (more preferably 90% by mass or more, still more preferably 95% by mass or more) of the aqueous solvent. A particularly preferable example is an aqueous solvent consisting essentially of water. Further, the solvent of the binder liquid 21d is not limited to the so-called aqueous solvent, and may be the so-called organic solvent system. For example, N-methylpyrrolidone (NMP) is of the organic solvent system.

A polymer material that can be dispersed or dissolved in the solvent to be used is preferably used as the binder to be included in the binder liquid 21d. Such a binder (first binder) may be, for example, the same as or different from that used for preparing the granulated particles. As an example, in the case, for example, of an aqueous solvent, it is preferable to use a styrene butadiene rubber (SBR), polyacrylic acid (PAA), or the like. When a solvent of an organic solvent system is used, for example, polyvinylidene fluoride (PVDF), polyacrylic acid (PAA), or the like can be advantageously used as the binder. As a preferable example of the binder liquid 21d, for example, in the positive electrode of the lithium ion secondary cell, it is preferable to mix SBR or acrylic resin (for example, a polymethacrylate resin) as a binder with water as a solvent. Further, in the negative electrode of the lithium ion secondary cell, SBR may be mixed as a binder with water as a solvent.

The amount of the solvent in the binder liquid 21d is preferably about 20% by mass to 80% by mass, and preferably 30% by mass to 75% by mass from the viewpoint of handleability and coatability.

The binder liquid 21d may be coated on the current collector 12, for example, in a predetermined coating pattern. Here, the binder liquid 21d is applied to a predetermined region of the current collector 12. The binder liquid 21d may be coated, for example, by gravure printing. For example, a direct gravure roll coater can be used as the binder coating device 21. In the binder coating device 21, the binder liquid 21d is transferred to the current collector 12 by a direct gravure process using a gravure roll 21a in which a predetermined pattern shape is engraved on the surface. In the example shown in FIG. 1, in the conveying device 22, the band current collector 12 is conveyed so that the treatment surface (the surface on which the active material layer is to be formed) to be coated with the binder liquid 21d faces downward, and the gravure roll 21a is brought into contact with the current collector 12. The lower side of the gravure roll 21a is immersed in the binder liquid 21d stored in a storage tank 21b. A back roll 21c is brought into contact with the back side of the surface of the gravure roll 21a which contacts the current collector 12. As a consequence, the binder liquid 21d stored in the storage tank 21b is continuously transferred to the current collector 12 through the gravure roll 21a. As a result of such transfer, the coating pattern of the binder liquid 21d, which is composed of coated portions 16a (see FIG. 3) and uncoated portions 16b (see FIG. 3) corresponding to the pattern shape of the gravure roll 21a is formed on the current collector 12.

Such a coating pattern may be formed in the region of the surface of the current collector 12 where the active material layer 14 is to be formed. When the area of the region of the surface of the current collector 12 where the active material layer 14 is to be formed is taken as 100%, from the viewpoint of increasing the adhesion between the current collector 12 and the active material layer 14, the exposed area ratio of the current collector 12 in the coating pattern may be about 5% or more and preferably 10% or more. Further, from the viewpoint of reducing the electric resistance, the exposed area ratio may be about 95% or less and preferably 90% or less. Details of the coating pattern will be described hereinbelow.

The binder coat layer 16 is formed on the surface of the current collector 12 by drying the coating pattern of the binder liquid 21d, as required, with a drying means such as a radiator. From the viewpoint of increasing the adhesion between the current collector 12 and the active material layer 14, the thickness of the binder coat layer 16 may be set, for example, to 0.2 µm or more and preferably to 0.5 µm or more. From the viewpoint of reducing the electric resistance, the thickness may be set, for example, to 10 µm or less and preferably to 5 µm or less. When the solvent amount in the binder liquid 21d is small, the drying means such as the radiator may be omitted.

<(b) Step of Supplying Granulated Particles>

In step (b), the granulated particles 32 are supplied onto the binder coat layer. In the example shown in FIG. 1, the current collector 12 is rolled along the conveying device 22 and is conveyed so that the surface on which the binder coat layer is formed faces upward. A granulated particle supplying device 24 is disposed in the conveying path of the current collector 12. The granulated particles 32 are supplied by the granulated particle supplying device 24.

As depicted in FIG. 2, the granulated particle 32 supplied herein contains at least active material particles 34 and the binder 36 (second binder). The granulated particle 32 can be in a form in which the binder 36 has adhered to the surfaces of the individual active material particles 34, and the active material particles 34 are bonded to each other by the binder 36. In one preferred embodiment, the binder 36 is dispersed substantially uniformly and disposed without being localized inside the granulated particle 32 or on the outer surface thereof. The granulated particle 32 may include a material other than the active material particles 34 and the binder 36, and may include, for example, a conductive material or a thickening material.

As for the properties of the granulated particles, for example, the average particle diameter R may be about 50 µm or more. From the viewpoint of forming a homogeneous active material layer, the average particle diameter R of the granulated particles is preferably 60 µm or more, and more preferably 70 µm or more. Further, the average particle diameter R of the granulated particles is approximately 120 µm or less, preferably 100 µm or less, and more preferably 75 µm or less. The technique disclosed herein can be preferably carried out, for example, in a mode in which the average particle diameter of the granulated particles is 50 µm or more and 120 µm or less.

In the present specification, the "average particle diameter" means, unless specified otherwise, a particle diameter at a cumulative value of 50% in a particle size distribution measured with a particle size distribution measuring apparatus based on a laser scattering-diffraction method, that is, means a 50% volume average particle diameter. Here, the particle diameter at a cumulative value of 50%, that is, the 50% volume average particle diameter is referred to, as appropriate, as "D50". More specifically, it is the 50% volume average particle diameter measured under dry conditions by using a laser diffraction-scattering type particle size distribution measuring apparatus (for example, "Microtrac MT-3200 II", manufactured by Nikkiso Co., Ltd.), without dispersing the particles with compressed air.

The granulated particles 32 can be prepared, for example, by mixing the active material particles 34 and the binder 36 at a predetermined ratio, granulating, and classifying. A method of granulation is not particularly restricted, and for example, a tumbling granulation method, a fluidized bed granulation method, a stirring granulation method, a compression granulation method, an extrusion granulation method, a crushing granulation method, and a spray drying method (spray granulation method) can be used. In a preferred embodiment, a mixture (suspension) prepared by mixing the active material particles 34 and the binder 36 in a solvent is granulated by a spray drying method. In the spray drying method, the mixture is sprayed in a dry atmosphere. At this time, the particles contained in the droplet to be sprayed are generally granulated as single agglomerate. Therefore, depending on the size of the droplet, the amount of solids contained in the granulated particle 32 changes, and the size, the mass and the like of the granulated particle 32 change. The droplet to be sprayed may contain at least the active material particles 34 and the binder 36. The droplet to be sprayed may also contain, for example, a conductive material or a thickening material.

In the case of forming a positive electrode for a lithium ion secondary cell, various materials conventionally used as positive electrode active materials for lithium ion secondary cells can be used, without particular limitation, as the positive electrode active material particles. The preferred examples include oxides (lithium transition metal oxides) including lithium and a transition metal element as constituent metal elements, such as a lithium nickel oxide (for example, $LiNiO_2$), a lithium cobalt oxide (for example, $LiCoO_2$), and a lithium manganese oxide (for example, $LiMn_2O_2$), and phosphates including lithium and a transition metal element as constituent metal elements, such as lithium manganese phosphate ($LiMnPO_4$) and lithium iron phosphate ($LiFePO_4$). The average particle diameter (D50) of the positive electrode active material particles is not particularly limited, but it is suitably about 1 μm to 10 μm, and preferably 4 μm to 6 μm.

In the case of forming a negative electrode for a lithium ion secondary cell, various materials conventionally used as negative electrode active materials for lithium ion secondary cells can be used, without particular limitation, as the negative electrode active material particles. The preferred examples include carbon materials such as graphite carbon and amorphous carbon, lithium transition metal oxides such as lithium titanate, lithium transition metal nitrides, and silicon compounds. The average particle diameter (D50) of the negative electrode active material particles is not particularly limited, but it is suitably about 10 μm to 30 μm, and preferably 15 μm to 25 μm. When a carbon material is used as the negative electrode active material particles, the specific surface area of the negative electrode active material particles is suitably about 1 $m^2$/g to 10 $m^2$/g, preferably 1.5 $m^2$/g to 5 $m^2$/g, and particularly preferably 2 $m^2$/g to 3 $m^2$/g.

As the binder 36 to be contained in the granulated particle 32, a material suitable for a granulation method which is to be used may be selected for use from among various materials capable of bonding the active material. As an example, when a wet granulation method (for example, the spray drying method) is used, a polymer soluble or dispersible in a solvent is used. Examples of polymers soluble or dispersible in an aqueous solvent include acrylate polymers, rubbers (styrene butadiene copolymer (SBR), acrylic acid-modified SBR resins (SBR latex), etc.), and vinyl acetate copolymers. Polyvinylidene fluoride (PVDF) is an example of polymers soluble or dispersible in a nonaqueous solvent. As the binder 36 to be contained in the granulated particles 32, a cellulose polymer and a fluororesin (for example, polytetrafluoroethylene (PTFE)) may be used.

Further, in a configuration including a conductive material, examples of the conductive material include a carbon material such as carbon powder and carbon fibers. Such conductive materials may be used individually or in combinations of two or more thereof. As the carbon powder, for example, powders of acetylene black (AB), oil furnace black, graphitized carbon black, carbon black, Ketjen black, and graphite can be used. Such a conductive material is suitably added to form a conductive path between the active material particle 34 and the current collector 12 when the active material particle 34 having poor electric conductivity is used.

Further, in a configuration including a thickener, for example, a material such as carboxymethyl cellulose (CMC), sodium salt of CMC (CMC-Na), polyvinyl alcohol (PVA), and ethylene-vinyl alcohol copolymer (EVOH) can be used. Such thickeners may be used individually or in combinations of two or more thereof.

The granulated particle supplying device 24 supplies the granulated particles 32 onto the binder coat layer of the current collector 12 conveyed by the conveying device 22. Here, the granulated particle supplying device 24 is provided with a hopper 24a that stores the granulated particles 32. The hopper 24a may be provided with an adjusting device for adjusting the amount of the granulated particles 32 to be supplied (such a configuration is not shown in the figure). In this case, the hopper 24a may adjust the supply amount of the granulated particles 32 according to, for example, the conveying speed of the current collector 12, and supply an appropriate amount of the granulated particles 32 onto the binder coat layer 16. Here, the granulated particles 32 are supplied as an aggregate (powder 30) in which a plurality of the granulated particles 32 is gathered.

<(c) Step of Leveling Granulated Particles>

In step (c), the granulated particles 32 supplied onto the binder coat layer 16 are leveled by applying the squeegee member 25. In this step, for example, the thickness of the granulated particles 32 supplied onto the binder coat layer (that is, the thickness of the powder 30 of the granulated particles 32) is uniformly adjusted. In this embodiment, the squeegee member 25 is provided on the downstream side of the granulated particle supplying device 24 (downstream side in the conveying path of the current collector). The squeegee member 25 adjusts the thickness of the granulated particles 32 supplied onto the binder coat layer. For example, a gap is provided between the squeegee member 25 and the current collector 12 (binder coat layer) to be conveyed, and the thickness of the granulated particles 32 passing therethrough is adjusted according to such a gap. In this embodiment, the squeegee member 25 is composed of a roller squeegee 25a and a back roll 25b arranged so as to sandwich, in the thickness direction, the granulated particles 32 supplied onto the current collector 12. In this case, the squeegee member 25 is a roll member, but it may be a blade member. The gap between the squeegee member 25 and the current collector 12 (binder coat layer) varies depending on the particle diameter and basis weight of the granulated particles 32, but is, for example, about 100 μm to 300 μm (preferably about 150 μm to 250 μm).

When the positive electrode for a lithium ion secondary cell is formed, the basis weight of the positive electrode granulated particles (that is, the mass per unit area of the positive electrode granulated particles) may be set to at least 15 mg/$cm^2$ (preferably 18.9 mg/$cm^2$ or more). The technique disclosed herein can be advantageously implemented, for example, in a mode in which the basis weight of the positive electrode granulated particles is 15 mg/$cm^2$ or more and 35 mg/$cm^2$ or less (preferably 18.9 mg/$cm^2$ or more and 35 mg/$cm^2$ or less).

When the negative electrode for a lithium ion secondary cell is formed, the basis weight of the negative electrode granulated particles (that is, the mass per unit area of the negative electrode granulated particles) may be set to at least 5 mg/$cm^2$ (preferably 9.3 mg/$cm^2$ or more). The basis weight of the negative electrode granulated particles is preferably 10 mg/cm² or more, and more preferably 15 mg/cm² or more. The technique disclosed herein can be advantageously implemented, for example, in a mode in which the basis weight of the negative electrode granulated particles is 5 mg/cm² or more and 20 mg/cm² or less (preferably 9.3 mg/cm² or more and 20 mg/cm² or less).

<(d) Pressing Step>

In step (d), the granulated particles 32 supplied onto the binder coat layer 16 are pressed (rolled) to form the active material layer 14 on the current collector 12. In this embodiment, the press rollers 26 and 27 are members which sandwich the granulated particles 32 and the current collector 12 in the conveying path along which the band current collector 12 is conveyed. In this case, the gap between the press rollers 26 and 27 may be adjusted with consideration for the thickness of the granulated particles 32 which are to be deposited on the current collector 12. As a result, the granulated particles 32 are pressed against the current collector 12 with an appropriate strength and fixedly attached to the current collector 12. At the same time, the number of contact zones of the binder 36 in the granulated particles 32 is increased, and the granulated particles 32 are closely adhered to each other. As a result, a layer including the active material particles 34 (the active material layer 14) is molded to a substantially constant thickness on the surface of the current collector 12.

The distance between the press rollers 26 and 27 may be adjusted, for example, so that the active material layer 14 to be formed has a desired property (for example, thickness or porosity). Further, a molding promoting means such as heating can be appropriately used at the time of pressing. By performing pressing in a heated state, it is possible to soften or melt the binder 36 contained in the granulated particles 32, and an effect of binding the granulated particles 32 more firmly can be expected.

Figure 3:
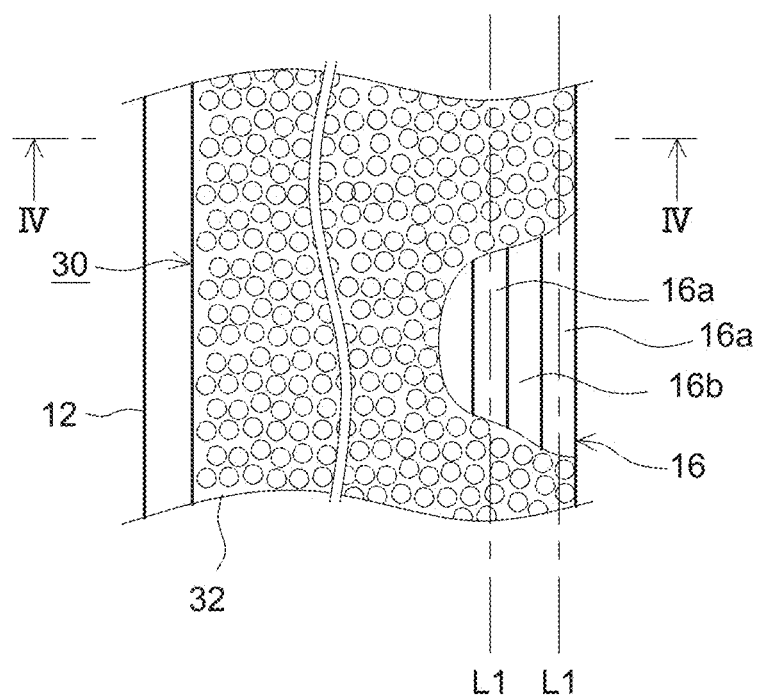
FIG. 3 is a plan view showing a binder coat layer deposited on a current collector and a powder of granulated particles.
Figure 4:
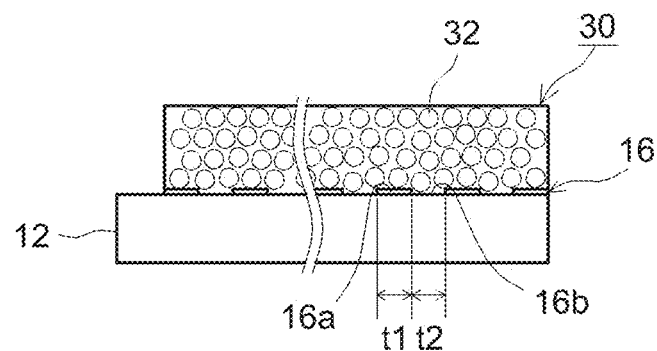
FIG. 4 is a cross-sectional view taken along the line IV-IV in FIG. 3.

The coating pattern of the binder coat layer 16 will be described hereinbelow in greater detail. FIG. 3 is a plan view showing the binder coat layer 16 deposited on the current collector 12 and the powder 30 of the granulated particles 32 supplied onto the binder coat layer 16. FIG. 4 is a cross-sectional view taken along the line IV-IV in FIG. 3. FIGS. 3 and 4 illustrate a state in which the powder 30 is virtually removed in part and the binder coat layer 16 is exposed.

As shown in FIGS. 3 and 4, the binder coat layer 16 is formed intermittently on the current collector 12 so that band (including a narrow linear shape, the same applies below) coated portions 16a where the binder liquid 21d has been coated and band uncoated portions 16b where the binder liquid 21d has not been coated are alternatingly adjacent to each other. In this embodiment, the coated portion 16a is formed along a plurality of lines (virtual lines) L1 extending in the longitudinal direction of the current collector 12. Here, the line L1 extending in the longitudinal direction of the current collector 12 is set as a straight line. Further, a plurality of lines L1 extending in the longitudinal direction of the current collector 12 is set so as to extend in parallel to the longitudinal direction of the current collector 12 and not to intersect each other. The coated portion 16a is formed along the plurality of lines L1 and is formed continuously on the current collector 12 so as to extend in the longitudinal direction.

In the manufacturing method disclosed herein, where the width of the coated portion 16a of the binder coat layer 16 (that is, the length in the width direction orthogonal to the longitudinal direction of the band coated portion 16a) is denoted by t1, the width of the uncoated portion 16b (that is, the length in the width direction orthogonal to the longitudinal direction of the band uncoated portion 16b) is denoted by t2, and the average particle diameter of the granulated particles 32 is denoted by R, the following relational expressions are satisfied:

$$0.53R \leq t1 \leq 10R, \quad (1)$$

$$0.66R \leq t2 \leq 10R, \quad (2)$$

$$0.2 \leq t1/t2 \leq 3.75. \quad (3)$$

<Width of Coated Portion>

Figure 5:
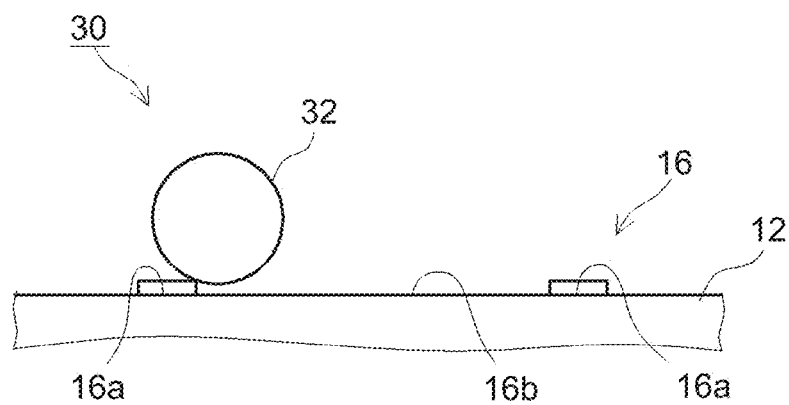
FIG. 5 is a view for explaining the relationship between the width of the coated portion and the particle diameter of the granulated particle.

The width t1 of the coated portion 16a may be $0.53R \leq t1$ with respect to the average particle diameter R of the granulated particles 32 as shown in formula (1). When the width t1 of the coated portion 16a is too small with respect to the average particle diameter R of the granulated particles 32, since the coated area of the binder with respect to the granulated particles 32 is too small, as shown in FIG. 5, the binding force of the binder coat layer 16 is insufficient, and the adhesion between the granulated particles 32 and the current collector 12 is reduced. The resulting effect is that during leveling with the above-described roller squeegee 25a (FIG. 1), the powder 30 of the granulated particles 32 cannot follow the movement of the current collector 12 to be conveyed and slips on the current collector 12. As a result, the powder 30 does not adequately enter the gap between the current collector 12 and the roller squeegee 25a, and a spread can occur in the supply amount (and eventually in the basis weight). From the viewpoint of improving the basis weight accuracy, the width t1 of the coated portion 16a is preferably $0.8R \leq t1$, more preferably $1R \leq t1$, and particularly preferably $1.5R \leq t1$ with respect to the average particle diameter R of the granulated particles 32.

Figure 6:
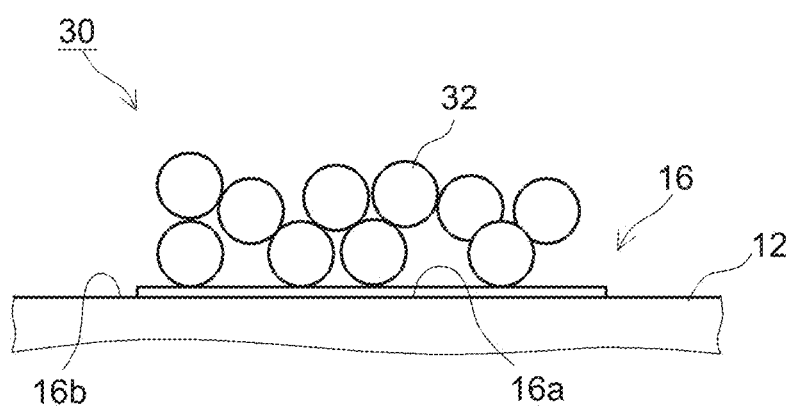
FIG. 6 is a view for explaining the relationship between the width of the coated portion and the particle diameter of the granulated particle.

Further, the width t1 of the coated portion 16a may be $t1 \leq 10R$ with respect to the average particle diameter R of the granulated particles 32. Where the width t1 of the coated portion 16a is too large with respect to the average particle diameter R of the granulated particles 32, since the coated area of the binder is too large with respect to the granulated particles 32, as shown in FIG. 6, the granulated particles 32 are unlikely to come into direct contact with the current collector 12. Therefore, sufficient electron conduction between the granulated particles 32 and the current collector 12 cannot be ensured, and the cell resistance increases. From the viewpoint of reducing the electric resistance, the width t1 of the coated portion 16a is preferably $t1 \leq 8R$, more preferably $t1 \leq 6R$, and particularly preferably $t1 \leq 2R$ with respect to the average particle diameter R of the granulated particles 32. For example, the coated portion 16a with the width t1 satisfying the relationship $0.53R \leq t1 \leq 10R$ (in particular, $0.53R \leq t1 \leq 2R$) is suitable from the viewpoint of improving the basis weight accuracy and also suppressing the increase in electric resistance.

When exemplifying the width t1 of the coated portion 16a, this example being not particularly limiting, where the average particle diameter R of the granulated particles 32 is, for example, 50 μm to 120 μm (in particular, 50 μm to 75 μm), the width t1 of the coated portion 16a can be set within a range of approximately 30 μm to 800 μm, preferably 40 μm to 750 μm, more preferably 60 μm to 500 μm, and particularly preferably 100 μm to 150 μm. Where the width t1 of the coated portion 16a is within these ranges, high basis weight accuracy and low electric resistance can be achieved at a higher level.

<Width of Uncoated Portion>

Figure 7:
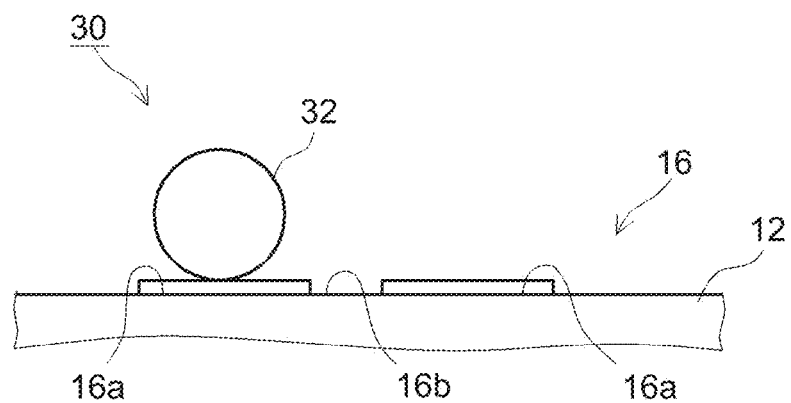
FIG. 7 is a view for explaining the relationship between the width of the uncoated portion and the particle diameter of the granulated particle.

The width t2 of the uncoated portion 16b may be 0.66R≤t2 with respect to the average particle diameter R of the granulated particles 32 as shown in formula (2) above. Where the width t2 of the uncoated portion 16b is too small with respect to the average particle diameter R of the granulated particles 32, as shown in FIG. 7, the granulated particles 32 are unlikely to come into direct contact with the current collector 12. Therefore, sufficient electron conduction between the granulated particles 32 and the current collector 12 cannot be ensured, and the cell resistance increases. From the viewpoint of reducing the electric resistance, the width t2 of the uncoated portion 16b is preferably 0.8R≤t2, more preferably 1.2R≤t2, and particularly preferably 1.5R≤t2 with respect to the average particle diameter R of the granulated particles 32.

Figure 8:
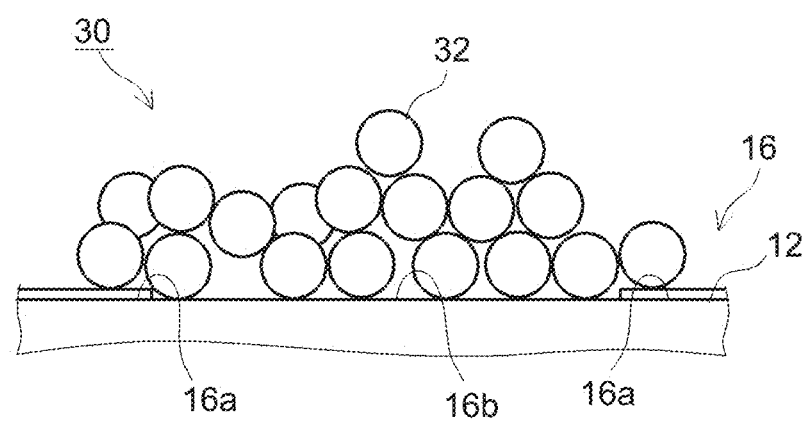
FIG. 8 is a view for explaining the relationship between the width of the uncoated portion and the particle diameter of the granulated particle.

The width t2 of the uncoated portion 16b may be t2≤10R with respect to the average particle diameter R of the granulated particles 32. Where the width t2 of the uncoated portion 16b is too large with respect to the average particle diameter R of the granulated particles 32, as shown in FIG. 8, the number of the granulated particles 32 directly contacting the current collector 12, without the binder being interposed therebetween, becomes too large. As a result, the adhesion between the granulated particles 32 and the current collector 12 is reduced. Therefore, during the leveling step performed by the roller squeegee 25a (FIG. 1), the powder 30 of the granulated particles 32 cannot follow the movement of the current collector 12, which is to be conveyed, and slips on the current collector 12. As a result, the powder 30 does not adequately enter the gap between the current collector 12 and the roller squeegee 25a, and a spread can occur in the supply amount (and eventually in the basis weight). From the viewpoint of improving the basis weight accuracy, the width t2 of the uncoated portion 16b is preferably t2≤6R, more preferably t2≤4R, and particularly preferably t2≤2.67R with respect to the average particle diameter R of the granulated particles 32. For example, the uncoated portion 16b with the width t2 satisfying the relationship 0.53R≤t2≤10R (in particular, 0.8R≤t2≤2.67R) is suitable from the viewpoint of improving the basis weight accuracy and also suppressing the increase in electric resistance.

When exemplifying the width t2 of the uncoated portion 16b, this example being not particularly limiting, where the average particle diameter R of the granulated particles 32 is, for example, 50 μm to 120 μm (in particular, 50 μm to 75 μm), the width t2 of the uncoated portion 16b can be set within a range of approximately 40 μm to 800 μm, preferably 50 μm to 750 μm, more preferably 60 μm to 500 μm, and particularly preferably 60 μm to 200 μm. Where the width t2 of the uncoated portion 16b is within these ranges, high basis weight accuracy and low electric resistance can be achieved at a higher level.

Further, the relationship between the width t1 of the coated portion 16a and the width t2 of the uncoated portion 16b may satisfy 0.2≤t1/t2≤3.75 as indicated by formula (3) above. By alternatingly providing the coated portion 16a and the uncoated portion 16b at such a width ratio (t1/t2), it is possible to arrange the powder 30 appropriately on the binder coat layer 16. The technique disclosed herein can be advantageously implemented, for example, in a mode in which the width ratio (t1/t2) is 0.75≤t1/t2≤3.

According to the manufacturing method disclosed herein, the widths t1 and t2 of the coated portion 16a and the uncoated portion 16b of the binder coat layer 16 are set to satisfy formulas (1) to (3) above with respect to the average particle diameter R of the granulated particles 32. As a result, since the powder 30 of the granulated particles 32 is appropriately arranged on the binder coat layer 16, the adhesion between the granulated particles 32 and the current collector 12 can be appropriately ensured without excessive application of the binder. In such a mode, the powder 30 of the granulated particles 32 is likely to enter appropriately the gap between the roller squeegee 25a and the current collector 12 during leveling with the roller squeegee 25a, while suppressing an increase in electric resistance. Therefore, the supply of the powder 30 onto the current collector 12 can be made more uniform. Further, it is possible to level the powder 30 of the excessively supplied granulated particles 32 to portions with small supply, and it is possible to form the active material layer 14 having a uniform basis weight on the current collector 12.

<Lithium Ion Secondary Cell>

Figure 9:
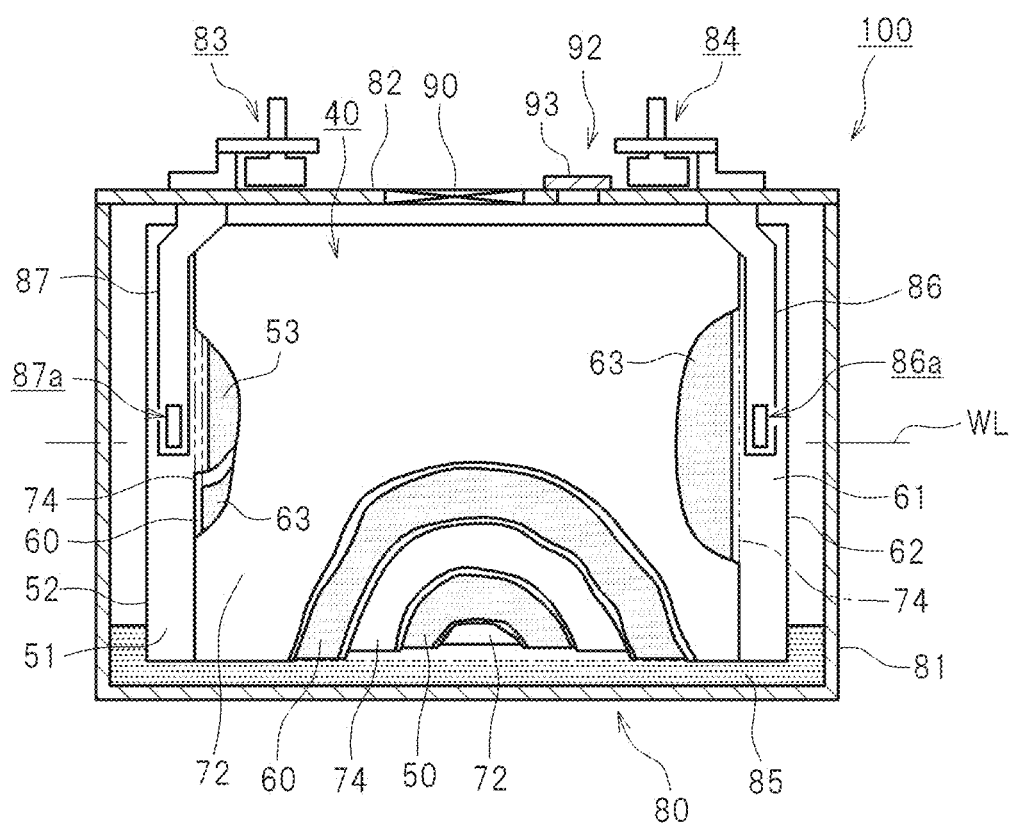
FIG. 9 is a diagram schematically showing a lithium ion secondary cell according to an embodiment.
Figure 10:
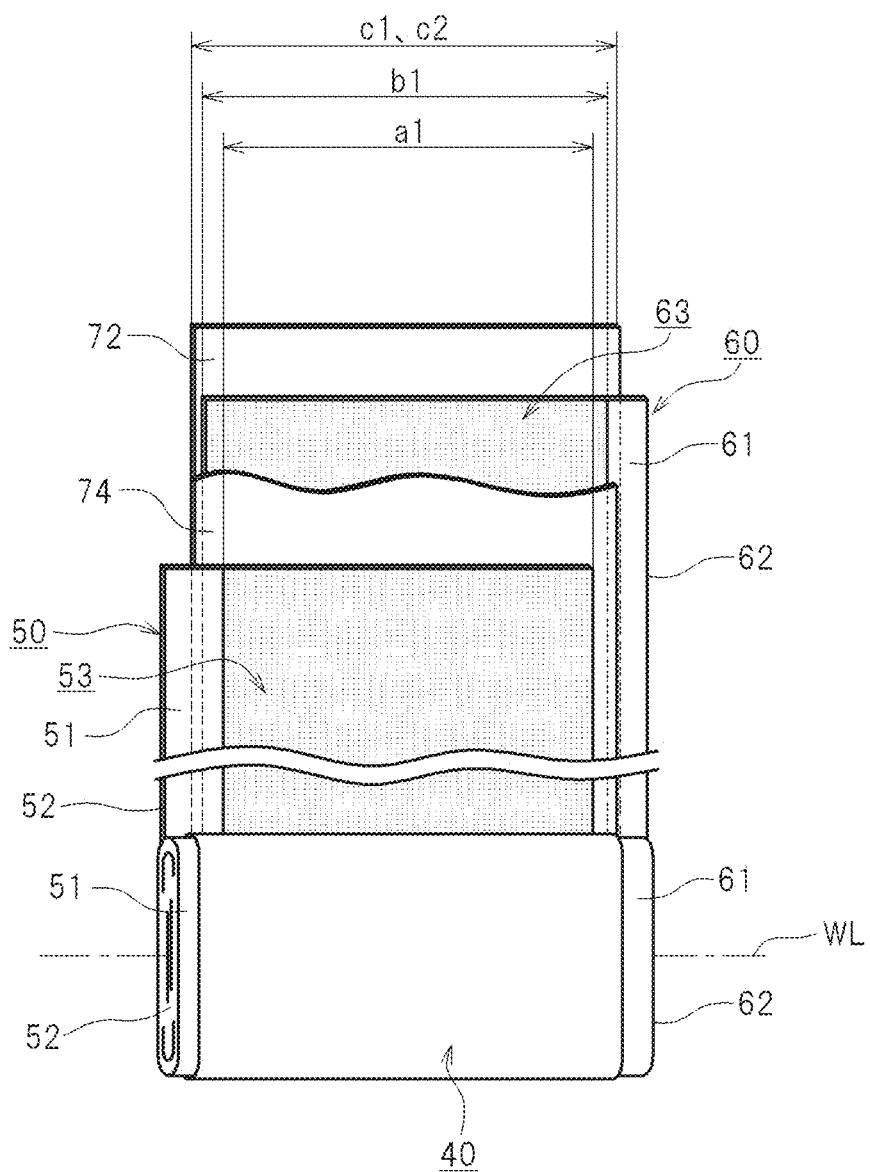
FIG. 10 is a view for explaining a wound electrode body according to an embodiment.

An embodiment of a lithium ion secondary cell constructed using a negative electrode (negative electrode sheet) and a positive electrode (positive electrode sheet) formed using the above-described manufacturing apparatus 10 is hereinbelow explained with reference to the schematic diagrams depicted in FIGS. 9 and 10. FIG. 9 is a cross-sectional view of a lithium ion secondary cell 100 according to an embodiment of the present invention. FIG. 10 is a view showing an electrode body 40 which is to be incorporated in the lithium ion secondary cell 100. In the lithium ion secondary cell 100, a positive electrode (positive electrode sheet) 50 manufactured using the above-described manufacturing apparatus 10 is used as the positive electrode (positive electrode sheet) 50. A negative electrode (negative electrode sheet) 60 manufactured using the above-described manufacturing apparatus 10 is used as the negative electrode (negative electrode sheet) 60.

As shown in FIG. 10, the positive electrode sheet 50 includes a band positive electrode current collector 52 and a positive electrode active material layer 53. The positive electrode active material layer non-forming portion 51 is set along the edge portion on one side in the width direction of the positive electrode current collector 52. In the example illustrated by the drawing, the positive electrode active material layer 53 is held on both surfaces of the positive electrode current collector 52 except for the positive electrode active material layer non-forming portion 51 which has been set at the positive electrode current collector 52. Since the method for manufacturing the positive electrode sheet 50 is as described above, the description thereof will be omitted.

The negative electrode sheet 60 includes a band negative electrode current collector 62 and a negative electrode active material layer 63. The negative electrode active material layer non-forming portion 61 is set along the edge portion on one side in the width direction of the negative electrode current collector 62. The negative electrode active material layer 63 is held on both surfaces of the negative electrode current collector 62 except for the negative electrode active material layer non-forming portion 61 which has been set at the negative electrode current collector 62. Since the method for manufacturing the negative electrode sheet 60 is as described above, the description thereof will be omitted.

As shown in FIG. 10, the separators 72 and 74 are members that separate the positive electrode sheet 50 and the negative electrode sheet 60 from each other. In this example, the separators 72 and 74 are configured of band sheet materials of a predetermined width that have a plurality of fine holes. For example, a separator having a single-layer structure or a separator having a laminated structure composed of a porous polyolefin resin can be used for the separators 72 and 74. Further, a layer of electrically insulating particles may be further formed on the surface of the sheet member composed of such a resin. Here, the electrically insulating particles, may be configured of an electrically insulating inorganic filler (for example, a filler such as a metal oxide or a metal hydroxide), or an electrically insulating resin particles (for example, particles of polyethylene and polypropylene). In this example, as shown in FIG. 10, the width b1 of the negative electrode active material layer 63 is slightly larger than the width a1 of the positive electrode active material layer 53. Further, the widths c1, c2 of the separators 72, 74 are slightly larger than the width b1 of the negative electrode active material layer 63 (c1, c2>b1>a1).

When the wound electrode body 40 is fabricated, the positive electrode sheet 50 and the negative electrode sheet 60 are laminated with the separators 72, 74 interposed therebetween. At this time, the positive electrode active material layer non-forming portion 51 of the positive electrode sheet 50 and the negative electrode active material layer non-forming portion 61 of the negative electrode sheet 60 are overlapped so as to protrude from both sides in the width direction of the separators 72 and 74, respectively. A flat wound electrode body 40 can be fabricated by winding the laminated body thus superimposed and then collapsing and crushing the obtained wound body from the side surface direction. In this embodiment, as shown in FIG. 10, the wound electrode body 40 is flatly pushed and bent in one direction orthogonal to a winding axis WL. In the example shown in FIG. 10, the positive electrode active material layer non-forming portion 51 of the positive electrode sheet 50 and the negative electrode active material layer non-forming portion 61 of the negative electrode sheet 60 are spirally exposed on both sides of the separators 72 and 74, respectively. In this embodiment, as shown in FIG. 9, the middle portions of the positive electrode active material layer non-forming portions 51 are gathered together and welded to the current collecting tabs 87, 86 of the electrode terminal (internal terminal) disposed inside the cell case 80. Reference numerals 87a and 86a in FIG. 9, indicate the welding zones.

The same nonaqueous electrolytic solution as has been conventionally used for a lithium ion secondary cell can be used without particular limitation as the electrolytic solution (nonaqueous electrolytic solution) 85. Such a nonaqueous electrolytic solution typically has a composition in which a support salt is contained in a suitable nonaqueous solvent. As the nonaqueous solvent, one or two or more kinds selected from the group consisting of ethylene carbonate, propylene carbonate, dimethyl carbonate, diethyl carbonate, ethylmethyl carbonate, 1,2-dimethoxyethane, 1,2-diethoxyethane, tetrahydrofuran, 1,3-dioxolane and the like can be used. Moreover, lithium salts such as $LiPF_6$, $LiBF_4$, $LiAsF_6$, $LiCF_3SO_3$, $LiC_4F_9SO_3$, $LiN(CF_3SO_2)_2$, and $LiC(CF_3SO_2)_3$ can be used as the support salt.

The process of sealing the case 80 and the process of placing (filling) the electrolytic solution may be the same as those performed in the manufacture of the conventional lithium ion secondary cell, and do not characterize the present invention.

In the lithium ion secondary cell 100 thus constructed, granulated particles are uniformly supplied to the surfaces of the positive electrode current collector 52 and the negative electrode current collector 62, and the cell includes the positive electrode 50 and the negative electrode 60 having the positive electrode active material layer 53 and the negative electrode active material layer 63 with high basis weight quality. Therefore, the cell can exhibit excellent performance. For example, such a lithium ion secondary cell 100 can satisfy at least one (preferably all) requirement(s) relating to excellent high-rate cycle characteristic, excellent input-output characteristic, and excellent thermal stability.

Several examples relating to the present invention will be described below, but the present invention is not intended to be limited to these examples.

Here, various samples of positive electrodes for a lithium ion secondary cell were prepared and basis weight accuracy thereof was evaluated. Further, lithium ion secondary cells (evaluation cells) were constructed using such positive electrode samples, and an IV resistance thereof was evaluated.

Test Example 1

<Fabrication of Positive Electrode Sheet>

A positive electrode sheet was fabricated in the following manner. A $LiNi_{1/3}Co_{1/3}Mn_{1/3}O_2$ powder (average particle diameter: 4 μm to 5 μm) as a positive electrode active material, AB as an electrically conductive material, an acrylate polymer as a binder, CMC-Na as a thickener, and LEOCOL (registered trademark: manufactured by Lion Corporation) as a surfactant were loaded together with water into a planetary disper, and uniformly mixed to prepare a preparation solution for forming positive electrode granulated particles. Then, this preparation liquid was sprayed, the solvent was removed in a droplet state, and drying was performed, thereby producing a powder of positive electrode granulated particles having an average particle diameter of 75 μm.

Next, a binder liquid in which an acrylate polymer as a binder was dispersed in water was prepared, and the binder liquid was pattern-coated on one surface of a positive electrode current collector (aluminum foil with a thickness of 15 μm was used) by gravure printing by using the manufacturing device such as depicted in FIG. 1 to form a binder coat layer. Here, as shown in FIGS. 3 and 4, the binder coat layer was intermittently formed on the positive electrode current collector so that the band coated portions 16a where the binder liquid was coated and the band uncoated portions 16b where the binder liquid was not coated were alternatingly adjacent to each other. The thickness of the binder coat layer was 1 μm.

Then, the powder of the positive electrode granulated particles was supplied onto the binder coat layer so as to obtain a basis weight of 18.9 mg/cm². The powder was leveled by applying a roller squeegee and the powder of the positive electrode granulated particles was then pressed to form a positive electrode active material layer having a thickness of 68 μm and a density of 2.8 g/cm³. A positive electrode sheet in which the positive electrode active material layer was held on one side of the positive electrode current collector was thus obtained.

Here, the width t1 (see FIG. 4) of the coated portion 16a and the width t2 (see FIG. 4) of the uncoated portion 16b of the binder coat layer differed among the samples of the positive electrode sheet. In this case, positive electrode sheets were fabricated by changing the width t1 of the coated portion 16a between 30 μm and 800 μm. Positive electrode sheets were also fabricated by changing the width t2 of the uncoated portion 16b between 40 μm and 800 μm.

<Calculation of Process Capability Index>

A total of 60 sections with a diameter of 30 mm were randomly punched out from the positive electrode sheet of each sample, and the basis weight of the positive electrode active material layer was measured. The process capability index (Cpk) of the basis weight was then calculated. Here, the process capability index (Cpk) is calculated as Cpk=(X−Ave)/3σ where Ave stands for the average value of the basis weight of each section, σ stands for a standard deviation, and X (mg/cm$^2$) stands for the lower limit standard value of the basis weight. Here, the lower limit standard value X was calculated as 18.3 mg/cm$^2$. The results are shown in Table 1. Here, where Cpk is 1.0 or more, the product is considered to be good "O", and where Cpk is less than 1.0, the product is considered to be poor "x".

[Table 1]

TABLE 1

| Width t1 of coated portion (μm) | Width t2 of uncoated portion (μm) | Average particle diameter R (μm) | t1 | t2 | t1/t2 | Cpk | | IV resistance (mΩ) | |
|---|---|---|---|---|---|---|---|---|---|
| 30 | 50 | 75 | 0.4R | 0.66R | 0.6 | 0.8 | x | 560 | x |
| 40 | 50 | 75 | 0.53R | 0.66R | 0.8 | 1.33 | o | 400 | o |
| 150 | 50 | 75 | 2R | 0.66R | 3 | 1.37 | o | 420 | o |
| 750 | 200 | 75 | 10R | 2.67R | 3.75 | 1.39 | o | 455 | o |
| 800 | 50 | 75 | 10.66R | 0.66R | 16 | 1.42 | o | 900 | x |
| 150 | 40 | 75 | 2R | 0.53R | 3.75 | 0.79 | x | 400 | o |
| 150 | 60 | 75 | 2R | 0.8R | 2.5 | 1.37 | o | 415 | o |
| 150 | 200 | 75 | 2R | 2.67R | 0.75 | 1.35 | o | 420 | o |
| 150 | 750 | 75 | 2R | 10R | 0.2 | 1.01 | o | 430 | o |
| 150 | 800 | 75 | 2R | 10.67R | 0.18 | 0.7 | x | 430 | o |

<Construction of Evaluation Cells>

Evaluation cells (laminate cells) were also constructed using the positive electrode sheet of each sample. The evaluation cell includes a positive electrode obtained by cutting the positive electrode sheet into a substantially rectangular shape, a negative electrode in which a negative electrode active material layer is formed on one side of the negative electrode current collector, a separator interposed between the positive electrode active material layer and the negative electrode active material layer, and an electrolytic solution.

The negative electrode of the evaluation cell was fabricated in the following manner. A natural graphite powder as a negative electrode active material, an acrylate polymer as a binder and CMC-Na as a thickener were loaded together with water into a planetary disper, and uniformly mixed to prepare a preparation solution for forming negative electrode granulated particles. Then, this preparation liquid was sprayed, the solvent was removed in a droplet state, and drying was performed, thereby producing a powder of negative electrode granulated particles.

Then, a copper foil having a thickness of 10 μm was prepared as a negative electrode current collector, and the powder of the negative electrode granulated particles was supplied onto one side of the negative electrode current collector by using the device depicted in FIG. 1 to obtain a basis weight of 9.3 mg/cm$^2$. The powder was leveled by applying a roller squeegee and the powder of the negative electrode granulated particles was then pressed to form a negative electrode active material layer having a thickness of 68 μm and a density of 1.36 g/cm$^3$. A negative electrode sheet in which the negative electrode active material layer was held on one side of the negative electrode current collector was thus obtained. The negative electrode sheet was cut into a substantially rectangular shape to obtain a negative electrode for the evaluation cell.

A microporous sheet of a three-layer structure (PP/PE/PP) in which two sides of polyethylene (PE) are sandwiched between polypropylene (PP), the sheet having a total thickness of 24 μm, was used for the separator of the evaluation cell.

The positive electrode and the negative electrode were laminated, with a separator interposed therebetween, such that the active material layers of the electrodes faced each other, and the laminate was accommodated together with the electrolytic solution in a laminate film (exterior member). An evaluation cell (laminate cell) was thus constructed.

<Measurement of IV Resistance>

Each evaluation cell was adjusted to a temperature of −6.7° C. and a SOC of 20% and CC discharged for 10 sec at a discharge rate of 4 C. A voltage drop at that time was measured. The IV resistance (mΩ) was calculated by dividing the value (V) of the measured voltage drop by the corresponding current value. The results are shown in Table 1. Here, where the IV resistance is less than 500 mΩ, the product is considered to be good "o", and where the IV resistance is 500 mΩ or more, the product is considered to be poor "x".

As shown in Table 1, when the average particle diameter R of the granulated particles was 75 μm, Cpk was 1.0 or more and the basis weight accuracy was good in all of the samples in which the width t1 of the coated portion of the binder coat layer was 0.53R≤t1≤10R and the width t2 of the uncoated portion was 0.66R≤t2≤10R. Further, all of the samples had the IV resistance less than 500 mΩ and excellent cell performance. These results indicate that high basis weight accuracy and a low electric resistance can be achieved at the same time by setting the width t1 of the coated portion of the binder coat layer to 0.53R≤t1≤10R and the width t2 of the uncoated portion to 0.66R≤t2≤10R.

Test Example 2

In this example, positive electrode sheets and evaluation cells were fabricated in the same procedure as in Test Example 1 except that the average particle diameter R of the granulated particles was changed to 50 μm. Here, the positive electrode sheets were fabricated by varying the width t1 of the coated portion 16a between 40 μm and 800 μm. Further, the positive electrode sheets were fabricated by varying the width t2 of the uncoated portion 16b between 40 µm and 800 µm. The results are shown in Table 2. In the sample having the width t1 of the coated portion of 150 µm and the width t2 of the uncoated portion of 800 µm, the active material layer could not be formed.

[Table 2]

TABLE 2

| Width t1 of coated portion (µm) | Width t2 of uncoated portion (µm) | Average particle diameter R (µm) | t1 | t2 | t1/t2 | Cpk | | IV resistance (mΩ) | |
|---|---|---|---|---|---|---|---|---|---|
| 40 | 50 | 50 | 0.8R | 1R | 0.8 | 1.36 | ○ | 410 | ○ |
| 150 | 50 | 50 | 3R | 1R | 3 | 1.38 | ○ | 435 | ○ |
| 800 | 50 | 50 | 16R | 1R | 16 | 1.42 | ○ | 870 | x |
| 150 | 40 | 50 | 3R | 0.8R | 3.75 | 1.39 | ○ | 475 | ○ |
| 150 | 60 | 50 | 3R | 1.2R | 2.5 | 1.36 | ○ | 400 | ○ |
| 150 | 200 | 50 | 3R | 4R | 0.75 | 1.33 | ○ | 410 | ○ |
| 150 | 800 | 50 | 3R | 16R | 0.18 | — | x | — | — |

As shown in Table 2, when the average particle diameter R of the granulated particles was 50 µm, Cpk was 1.0 or more and the basis weight accuracy was good in all of the samples in which the width t1 of the coated portion of the binder coat layer was $0.8R \leq t1 \leq 3R$ and the width t2 of the uncoated portion was $0.8R \leq t2 \leq 4R$. Further, all of the samples had the IV resistance less than 500 mΩ and excellent cell performance. These results indicate that high basis weight accuracy and a low electric resistance can be achieved at the same time.

Explained hereinabove is a method of manufacturing an electrode for a lithium ion secondary cell proposed herein, but the method for manufacturing an electrode for a lithium ion secondary cell according to the present invention is not limited to the above-described embodiment unless specifically stated otherwise.

Figure 11:
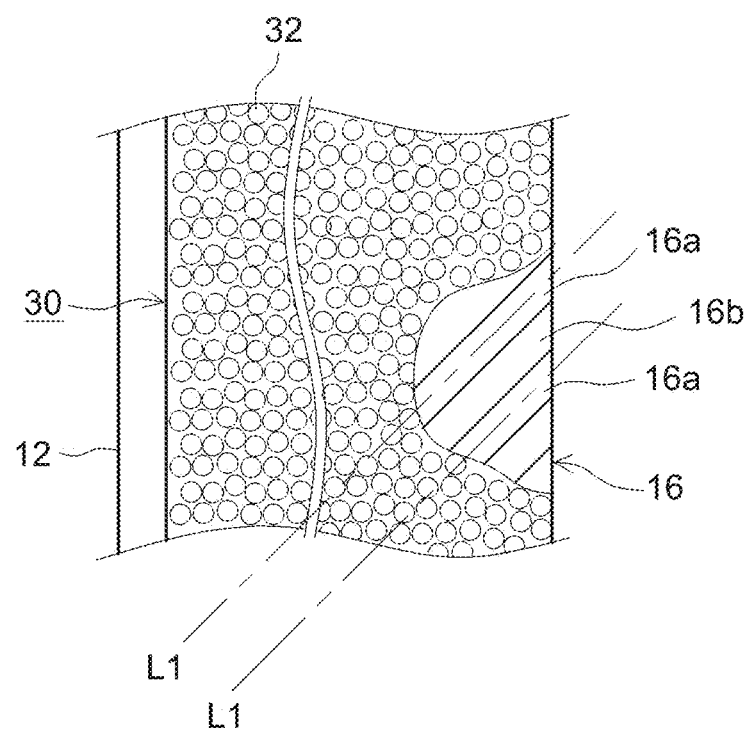
FIG. 11 is a view showing a modified example of the binder coat layer.

For example, in the examples illustrated by FIGS. 3 and 4, the coated portion 16a of the binder coat layer 16 is formed along a plurality of lines (imaginary lines) L1 extending in the longitudinal direction of the current collector 12. This coating pattern of the binder coat layer 16 is not limiting. The binder coat layer 16 may be intermittently formed on the current collector 12 so that the band coated portion 16a and the band uncoated portion 16b are alternatingly adjacent to each other. For example, as shown in FIG. 11, the coated portion 16a may be formed along a plurality of lines L1 obliquely crossing the current collector 12. In this case, effects equal to or higher than those of the above-described embodiment can be obtained. Alternatively, the current collector 12 may be formed along a line traversing in a zigzag manner. Even in such a case, the above-described effects can be obtained.

A lithium ion secondary cell including the electrode manufactured by the manufacturing method proposed herein has the electrode with stable quality and high basis weight accuracy of the active material layer. Therefore, it can be advantageously used in applications requiring stable performance. Such applications include, for example, a power source (driving power source) for a motor mounted on a vehicle. There are no particular restrictions on the type of the vehicle, and suitable examples thereof include a plug-in hybrid vehicle (PHV), a hybrid vehicle (HV), an electric vehicle (EV), an electric truck, a motorized bicycle, an electric assisted bicycle, an electric wheelchair and an electric railroad. Such lithium ion secondary cells may be used in the form of a cell pack in which a plurality of the cells is connected in series and/or in parallel.

INDUSTRIAL APPLICABILITY

According to the present invention, it is possible to provide a method for manufacturing an electrode for a lithium ion secondary cell that can improve the unit weight accuracy and reduce the electric resistance at the same time.

The invention claimed is:

1. A method for manufacturing an electrode for a lithium ion secondary cell, comprising:
   a step of pattern-coating a binder liquid on a current collector and forming a binder coat layer;
   a step of supplying granulated particles including individual active material particles and a binder onto the binder coat layer;
   a step of leveling the granulated particles supplied onto the binder coat layer by applying a squeegee member; and
   a step of pressing the leveled granulated particles, wherein
   the binder coat layer is intermittently formed on the current collector,
   the binder coat layer comprises band or linear coated portions where the binder liquid has been coated and band or linear uncoated portions where the binder liquid has not been coated,
   the coated portions and the uncoated portions are alternatingly adjacent to each other,
   the granulated particles are in a form in which the binder has adhered to the surfaces of the individual active material particles, and the individual active material particles are bonded to each other by the binder,
   the average particle diameter of the granulated particles is 50 µm or more and 120 µm or less,
   a gap between the squeegee member and the current collector is 150 µm to 250 µm,
   where the width of the coated portion is denoted by t1, the width of the uncoated portion is denoted by t2, and the average particle diameter of the granulated particles is denoted as R, the following relational expressions (1) to (3) are satisfied:

$$0.53R \leq t1 \leq 10R, \quad (1)$$

$$0.66R \leq t2 \leq 10R, \quad (2)$$

$$0.2 \leq t1/t2 \leq 3.75, \quad (3)$$

the width t1 of the coated portion is 40 µm to 750 µm, and the width t2 of the uncoated portion is 60 µm to 500 µm.

2. The manufacturing method according to claim 1, wherein the width t1 of the coated portion and the average particle diameter R of the granulated particles satisfy a relationship of $0.53R \leq t1 \leq 2R$.

3. The manufacturing method according to claim 1, wherein the width t2 of the uncoated portion and the average particle diameter R of the granulated particles satisfy a relationship of $0.8R \leq t2 \leq 2.67R$.

4. The manufacturing method according to claim 1, wherein
the average particle diameter R of the granulated particles is 50 μm to 75 μm.

5. The manufacturing method according to claim 1, wherein
the current collector is a long sheet current collector; and
the coated portion is continuously formed so as to extend in a longitudinal direction of the current collector.

* * * * *